United States Patent [19]

Kato et al.

[11] 3,762,809

[45] Oct. 2, 1973

[54] ORIGINAL MOUNT OR HOLDER FOR OPTICAL PROJECTION SYSTEM

[75] Inventors: Saburo Kato, Koto-ku, Tokyo; Hideo Sawada, Sagamihara-shi, botb of Japan

[73] Assignee: Ricoh Co., Ltd., Tokyo, Japan

[22] Filed: Dec. 30, 1970

[21] Appl. No.: 102,788

[30] Foreign Application Priority Data
Jan. 7, 1970 Japan.................................. 45/2125
Jan. 7, 1970 Japan.................................. 45/2126

[52] U.S. Cl.................... 353/66, 353/98, 353/19
[51] Int. Cl.. G03b 21/06, G03b 21/28, G03b 31/06
[58] Field of Search ................... 353/98, 99, 65, 66, 353/100, 122, 120, 15, 19, 22–24

[56] References Cited
UNITED STATES PATENTS

| 3,185,776 | 5/1965 | Bender | 35/35 C |
|---|---|---|---|
| 3,525,566 | 8/1970 | Altman | 353/66 |
| 3,486,817 | 12/1969 | Hubner | 353/98 |
| 3,340,765 | 9/1967 | Herriott | 353/38 |
| 3,222,986 | 12/1965 | Altman | 353/66 |
| 3,401,593 | 9/1968 | Altman | 353/98 |
| 3,532,420 | 10/1970 | Michelson | 353/99 |

FOREIGN PATENTS OR APPLICATIONS

| 978,125 | 12/1964 | Great Britain | 353/19 |

*Primary Examiner*—Louis R. Prince
*Assistant Examiner*—A. J. Mirabito
*Attorney*—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57] ABSTRACT

An original mount or holder for an overhead projector is provided in which a transparent original is formed or placed upon the flat surface of a Fresnal lens and a light reflecting surface or coating is formed either upon the stepped surface of the Fresnel lens opposite to the flat surface where the transparent original is formed or on the surface of the transparent original not engaging the Fresnel lens. An image of the original may be projected upon a screen by a projection lens which directs light beams that have been reflected by the reflecting surface or coating and passed undiffracted through the flat interface between the transparent original and the Fresnel lens achieving a sharper, brighter image.

6 Claims, 7 Drawing Figures

INVENTORS
SABURO KATO
HIDEO SAWADA

ORIGINAL MOUNT OR HOLDER FOR OPTICAL PROJECTION SYSTEM

BACKGROUND OF THE INVENTION

The present invention relates to generally an original mount or holder for use in an optical projection system and more particularly an original mount or holder for use with a reflection type overhead projector.

In general, in the conventional transmission type overhead projector a light source and a Fresnel lens serving as a condenser lens are disposed below a stage upon which is placed a transparent original to be projected, so that the optical image of the original may be formed by the light beam passing through the transparent original. In the conventional reflection type overhead projector, the transparent original placed upon the reflecting Fresnel surface of the stage is reflected by the light beams from a light source in a head disposed upwardly of the stage.

The transmission type overhead projector is widely used but since the light source is disposed below the stage, the stage is high, so that an operator may find it difficult to see the original placed over the stage when the overhead projector is placed upon a desk. In the case of the reflection type overhead projector, the stage is not as high, so that the problem encountered with the transmission type overhead projector may be eliminated, but there are portions at which the original may not be intimately in contact with the Fresnel lens so that the sharp and bright image is not formed.

In the conventional transparent original used in the reflection type optical projector, all of the images upon the original are projected, so that what is not required to be projected is not recroded upon the original. Further, it has been impossible to provide the original with any means for recording a description of the original to be projected, such as on magnetic recording means. In addition it is impossible to record two images upon the same original so as to be projected separately.

SUMMARY OF THE INVENTION

One of the objects of the present invention is to provide an original mount or holder for the reflection type optical projection system capable of giving a sharp image of relatively high luminance.

Another object of the present invention is to provide an original mount for the reflection type optical projection system, capable of recording what is not desired to be projected upon the rear surface of the original mount or holder.

Another object of the present invention is to provide an original mount or holder for the reflection type optical projection system capable of magnetic recording upon the rear surface of the original mount or holder.

Another object of the present invention is to provide an original mount or holder for the reflection type optical projection system capable of mounting two originals upon both surfaces of the original mount or holder.

According to one aspect of the present invention, an original mount or holder comprises a Fresnel lens made of a transparent material such as a suitable plastic, a transparent original formed or placed upon the flat surface of the Fresnel lens and a reflecting surface or coating on the other surface of the Fresnel lens. Light from a light source of the projector is reflected by the reflecting surface or coating and condensed by the Fresnel lens so as to project the original upon the screen through the projection lens.

According to another aspect of the present invention, a magnetic recording layer or sheet may be formed on the surface of the original mount or holder opposed to the surface upon which is formed or placed the transparent original, so that a description of the original may be recorded and reproduced simultaneously when the original is projected.

According to another aspect of the present invention, recording maybe made by a pen or pencil upon the rear surface of the original mount or holder.

According to another aspect of the present invention, two originals to be projected separately may be mounted on both surfaces of the original mount or holder with the reflecting surfaces or coatings interposed between the two transparent originals. As a variation, the two different reflecting surface or coating groups may be formed into one continuous reflecting surface or coating group. In the variation, the luminance of the image projected is reduced but the production of the original mounts or holders may be much facilitated.

The above and other objects of the present invention will become more apparent from the description of the preferred embodiments thereof taken in conjunction with the accompanying drawing.

Figure 1:
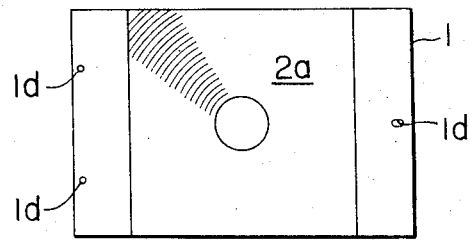
FIG.1 is a top view of a first embodiment of the present invention.
Figure 2:
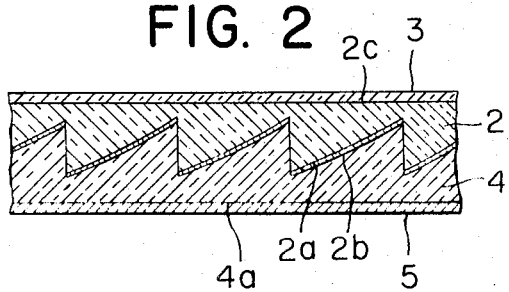
FIG.2 is a fragmentary sectional view of the embodiment of FIG. 1 on an enlarged scale.

DESCRIPTION OF THE PREFERRED EMBODIMENTS:

Referring to FIGS.1 and 2, the first embodiment of an original mount or holder 1 in accordance with the present invention comprises a Fresnel lens 2, with a transparent positive original or image 3 having the information to be projected such as characters, symbols, patterns and the like on its upper flat surface 2c and a reflecting surface or coating 2b on its stepped or Fresnel surface 2a. The original or image 3 is recorded upon the upper flat surface 2c by a suitable means such as printing, and a flat coating 4a is applied to the Fresnel surface 2a at 4 and having a magnetic recording band 5. The reflecting surface or coating 2b is formed by, for example, spattering aluminum upon the Fresnel surface 2a. The positioning holes 1d are formed in the original 1 as shown in FIG.1.

Figure 3:
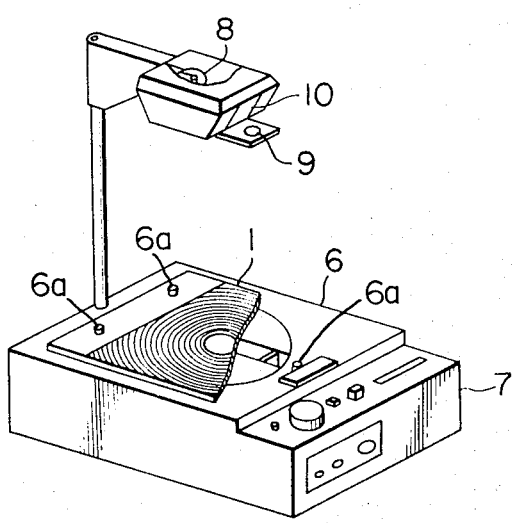
FIG.3 is a perspective view of an example of an overhead projector by which the original or originals mounted upon the original mount or holder of the present invention may be projected.

An overhead projector for projecting the original mount or holder 1 of the type described is illustrated in FIG.3. The original mount or holder 1 is placed upon the stage 6 having the positioning pins 6a fitted into the corresponding positioning holes 1d of the original mount or holder 1. The overhead projector incorporates a magnetic sheet recording-reproducing device 7 disposed below the stage 6. A suitable recording reproducing device for this purpose is disclosed in U.S. Pat. No. 3,074,724 and so under the registered trademark RICOHSYNCHROFAX. The projector head including a light source 8, a projection lens 9 and a reflecting mirror 10 is disposed upwardly of the stage 6. Light from the light source 8 transmits through the positive original or image 3 and the Fresnel lens 2 and is reflected by the coating 2b on the Fresnel surface 2a so as to be redirected to the projection lens 9 and the reflecting mirror 10 through the Fresnel lens 2 and the positive original or image 3 as viewed from FIG.4 so that the original 3 is projected upon a screen (not shown). Simultaneously, the magnetic recording band or sheet 5 upon the undersurface of the original mount or holder 1 is reproduced for explanation of the projected image or information.

Figure 5:
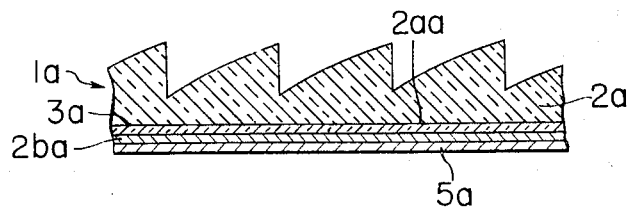
FIG.5 is a fragmentary sectional view on an enlarged scale of a second embodiment of the present invention.

The second embodiment of the present invention is illustrated in FIG.5. The original mount or holder 1a comprises a Fresnel lens 2a, a transparent positive original or image 3a formed upon the flat surface 2aa of the Fresnel lens 2a, the reflecting surface 2ba formed upon the undersurface of the transparent positive image 3a and a magnetic recording band or layer 5a formed upon the undersurface of the reflecting surface 2ba. The original mount or holder 1a is placed upon the stage 6 with the Fresnel surface 2aa of the Fresnel lens 2a faced upwardly. Light transmitted through the transparent positive original or image 3 is reflected by the reflecting surface 2ba so as to be redirected toward the projection lens undiffracted through the interface between the image 3a and the Fresnel lens 2a. Thus a sharper and brighter optical image of the original 3 is projected upon the screen (not shown).

In the first and second embodiments described above, it is not necessary to form the magnetic recording band or layer 5 or 5a. The undersurface coating may be used for recording desired items.

As described hereinabove, the original mount or holder according to the present invention consists of the integrally formed light condensing-and-reflecting surface, the transparent image and the opaque recording surface. Since the light condensing-and-reflecting surface is in intimate contact with the transparent positive image, the projected image is so bright as to be viewed even in a light room. In addition since the opaque recording surface is formed upon the undersurface of the original mount or holder, the detailed information of the image to be projected may be freely recorded thereupon. Especially when the magnetic recording band or layer is formed upon the undersurface of the original mount or holder, the magnetically recorded information may be conveniently reproduced simultaneously when the original is projected, that is the audio-visual information may be simultaneously reproduced. The first embodiment has the advantage that its Fresnel surface is prevented from being damaged since it is disposed at the center of the original mount or holder. In addition, the handling is facilitated. In the second embodiment, the Fresnel surface is directed toward the light source, so that the light from the light source does not transmit through the transparent positive image. Therefore, there is an advantage that the exceedingly bright image may be projected without being affected by the light transmitting property, the variation of the refractive index and the like of the transparent positive original or image.

Figure 6:
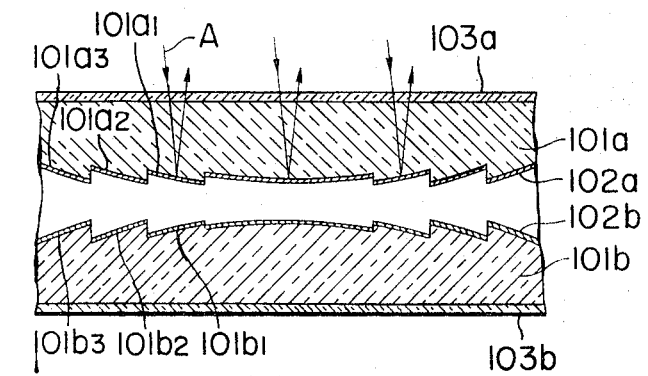
FIGS.6 and 7 are fragmentary sectional views on an enlarged scale of third and fourth embodiments of the present invention respectively.
Figure 7:
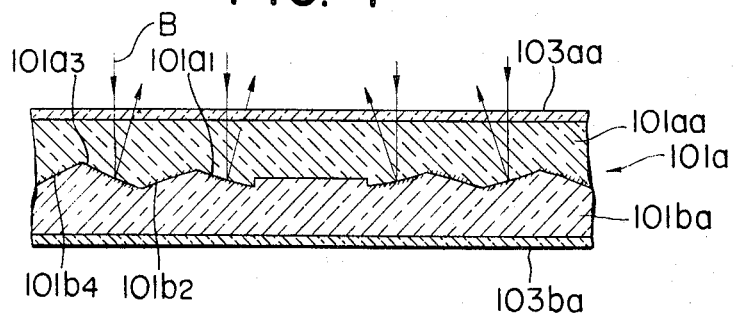

The third and fourth embodiments illustrated in FIGS. 6 and 7 are of the type having the transparent originals disposed on both surfaces of an original mount or holder.

Referring to FIG.6, two Fresnel lenses 101a and 101b having the reflecting coatings or surfaces 102a and 102b are disposed in back-to-back relation in such a way that the flat surfaces may be in parallel with each other. Transparent positive originals 103a and 103b are fixed to the flat surfaces of the Fresnel lenses 101a and 101b, so that the original mount or holder of the third embodiment has two positive originals each having different information.

The original mount or holder with the transparent positive original 103a faced upwardly is placed upon the stage of a reflecting type overhead projector. The beam A from the light source 8 (See FIG.4) is transmitted through the Fresnel lens 101a and reflected by its reflecting coating or surface 102a so as to be redirected toward the optical projection head through the Fresnel lens 101a and the transparent positive original 103a. Thus, the image is projected upon the screen by the projection lens and the reflecting mirror in a manner well known. It is, of course, seen that the other transparent positive original 103b will not be projected at all. On the other hand, when the other positive 103b is projected, the transparent positive original 103a will not be projected.

Next the fourth embodiment of the present invention will be described with reference to FIGS.6 and 7. The concentric steps of the Fresnel lenses 101a and 101b are indicated by $101a_1$, $101a_2$, $101a_3$ and so on and $101b_1$, $101b_2$, $101b_3$ and so on from the centers to the edges. In the first Fresnel lens 101aa in the fourth embodiment shown in FIG.7 the concentric ring-shaped steps or elements indicated by $101a_n$ where the suffix n is an odd number (1, 3, 5, . . . . ) are disposed as shown in FIG.7 and their convex surfaces are coated by sputtering of aluminum so as to form reflecting coatings. On the other hand, the Fresnel lens 101ba consists of the concentric steps or elements indicated by the reference numerals $101b_m$ where the suffix m is an even number (2, 4, 6, . . . . . ) and their convex surfaces are applied with the reflecting coatings. These Fresnel lenses 101aa and 101ba are made into a unitary construction in back-to-back relation as shown in FIG.7. Transparent positive originals 103aa and 103ba are placed upon both of the flat surfaces of the Fresnel lenses 101aa and 101ba.

Figure 4:
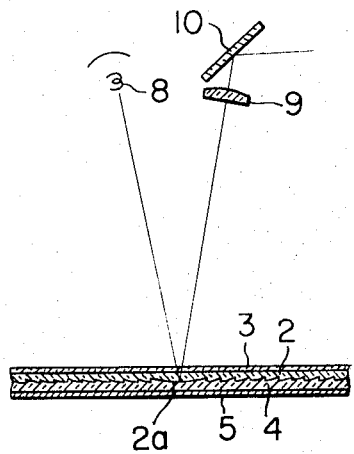
FIG.4 is a diagrammatic view illustrating the optical path of the over-head projector of FIG.3.

For example, when the transparent positive original 103aa is placed against the projector head shown in FIG.4, the beams B from the light source are transmitted through the transparent positive original 103aa and the Fresnel lens 101aa and are reflected by the concentric steps or elements $101a_1$, $101a_3$, $101a_5$ and so on so as to be redirected toward the projection lens. Thus the image of the original 103aa is projected upon the screen. When the transparent positive original 103ba is placed toward the projection head, the light beams are reflected by the concentric steps or elements $101b_2$, $101b_4$, $101b_6$ and so on of the Fresnel lens 101ba.

In the fourth embodiment shown in FIG.7, only one half of the concentric steps or elements of the otherwise normal Fresnel lens serve to condense and reflect the light beams, so that the quantity of the projected light is almost reduced to one half of the light quantity of the normal Fresnel lens as shown in FIGS. 2 and 5, but since the transparent positive original is placed upon the flat surface of the Fresnel lens the light reflection efficiency is very high and the projected light by use of the conventional overhead projector is sufficient enough for giving an image of relatively high luminance.

In the third and fourth embodiments described above with reference to FIGS. 6 and 7, two different informations may be mounted on the single mount or original holder which may be made to have a small thickness so that a large number of originals to be projected may be easily transported. When a pair of originals are mounted on the same mount or original holder, they may be easily selected for projection in sequence. Since the Fresnel lenses are incorporated a very bright image may be projected. In addition, since the Fresnel surfaces are disposed within the original mount or holder, they are not damaged and handling may be facilitated.

What is claimed is:

1. An original mount for use in a reflection type optical projection system of the type having a light source for projecting light onto an original and a projection lens for focusing the light reflected therefrom, said mount comprising the combination of:
   a. a Fresnel lens having a flat surface and a stepped surface;
   b. a transparent original containing the information to be projected, and having two opposed flat surfaces, one of said flat surfaces disposed in engagement with the flat surface of said Fresnel lens; and
   c. a light reflecting surface disposed on the non-engaging surface of said transparent original such that light from said source reflected by said reflecting surface will be transmitted undiffracted through the interface formed by the engagement of the flat surfaces of said transparent original and said Fresnel lens before being projected by said projection lens.

2. An original mount as in claim 1 wherein said original mount includes a recording surface on the opposite side of said reflecting surface from said light source.

3. An original mount as in claim 2 wherein said recording surface is adapted to receive written information.

4. An original mount as in claim 2 wherein said recording surface is adapted for magnetic recording.

5. An original mount for use in a reflection type optical projection system of the type having a light source for projecting light onto an original and a projection lens for focussing the light reflected therefrom, said mount comprising the combination of:
   a. two Fresnel lenses, each having a flat surface and a stepped surface;
   b. two transparent originals containing information to be projected, and each having two opposed flat surfaces, one of said flat surfaces disposed respectively in engagement with the flat surface of one of said Fresnel lenses; and
   c. light reflecting surfaces disposed on said stepped surfaces of said Fresnel lenses with the rear surfaces of the two reflecting surfaces disposed in back-to-back relation such that the transparent originals are formed upon the outwardly diposed flat surfaces of said Fresnel lenses and light from said source reflected by said reflecting surfaces will be transmitted undiffracted through the interface formed by the engagement of the flat surfaces of said transparent originals and said Fresnel lenses before being projected by said projection lens.

6. An original mount as in claim 5 wherein the front surfaces of the two reflecting surfaces on the stepped surfaces of said two Fresnel lenses are alternately disposed such that the respective surfaces are interfitted when the two Fresnel lenses are placed in back-to-back relationship.

* * * * *